United States Patent [19]

Walsh et al.

[11] 4,048,639

[45] Sept. 13, 1977

[54] INK JET NOZZLE WITH TILTED ARRANGEMENT

[75] Inventors: James Calvin Walsh; Joseph Townsend Wilson, III, both of Endicott; Bruce Allen Wolfe, Johnson City, all of N.Y.

[73] Assignee: International Business Machines Corporation, Armonk, N.Y.

[21] Appl. No.: 754,769

[22] Filed: Dec. 27, 1976

[51] Int. Cl.[2] .............................................. G01D 15/18
[52] U.S. Cl. ...................................................... 346/75
[58] Field of Search ........................................... 346/75

[56] References Cited

U.S. PATENT DOCUMENTS

| | | | |
|---|---|---|---|
| 3,739,395 | 6/1973 | King | 346/75 |
| 3,895,386 | 7/1975 | Keur et al. | 346/75 X |

*Primary Examiner*—George H. Miller, Jr.
*Attorney, Agent, or Firm*—Kenneth P. Johnson

[57] ABSTRACT

Method of improving mark alignment by causing substantially simultaneous impact on a recording medium of drops issuing as a series from an ink jet nozzle moving relative to the recording medium, by successively decreasing the deflection of each drop in the series and positioning the nozzle with respect to the recording surface to alter the respective path lengths of the drops such that the first and last drops of the series reach the recording member at approximately the same time.

5 Claims, 10 Drawing Figures

INK JET NOZZLE WITH TILTED ARRANGEMENT

BACKGROUND OF THE INVENTION

In ink jet printers, the printhead and recording medium are usually moved continuously relative to each other. During the movement, drops of ink are deflected to selected sites on the record medium along axes transverse to the path of motion. Because the drops are generated in succession from a nozzle, a straight line segment such as a character stroke, has an inclination in which the drops forming the segment do not lie on a line normal to the direction of motion.

The usual correction for the inclination has been to alter the direction of the deflecting force field for the drops an amount which will result in a non-inclined column of marks forming the line segment. One form of compensation is that of tilting the deflecting electrodes in electrostatic printing such as shown in U.S. Pat. Nos. 3,641,588 and 3,813,676. Another method has been to distort the force field by offsetting or skewing the deflecting electrodes such as disclosed in U.S. Pat. No. 3,895,386. Yet another technique has been the addition of a pair of compensating deflecting electrodes along the drop flight path which are normal to the principal deflection electrodes and impart a correcting amount of deflection to that produced by the principal electrodes, as shown in U.S. Pat. No. 3,938,163.

Frequently, it is desirable to record while the printhead is moving along both the forward and return strokes to increase printing throughput. The first two correction technques mentioned above require mechanical repositioning of the electrodes at the end of each line of print to provide a proper correction in the opposite direction. Such mechanical repositioning invites errors in the rapid adjustment necessary to maintain printing efficiency. When the printhead is moved in both directions with the same velocity, the positioning will be double the compensation amount, thus requiring the rapid movement of a relatively large mass. The last of the above-mentioned techniques has the disadvantage of increasing the drop flight path in order to acommodate the auxiliary electrodes. Such path extension necessitates greater flight time and the attendant adverse drop interaction and aerodynamic effects.

In U.S. Pat. No. 3,938,163, it is observed that drops may be scanned upward, known as forward rastering, or downward known commonly as reverse rastering, and that the angle of inclination of a column of drops will be dependent upon the direction of travel and the direction of rastering. U.S. Pat. application, Ser. No. 751,235 entitled "Bi-Directional Dot Matrix Printer" filed by L. V. Galetto et al. on Dec. 16, 1976 and assigned to the assignee of the present invention, has used forward and reverse rastering to avoid the adjustment of deflection electrodes when changing the direction of printing. Instead, the direction of raster is changed at the end of each printed line so that all characters have the same inclination or are oriented normal to the direction of travel of the printhead. Although this latter technique avoids adjustment of the deflection electrodes, it requires that the sequence of drop charging be reversed for each line.

SUMMARY OF THE INVENTION

It is a primary object of this invention to provide an ink jet recording method of forming with a series of drops a plurality of successive marks on a recording surface that lie along a common line normal to the plane of the deflection plates on a relatively moving recording surface.

Another important object of this invention is to provide a method of recording a series of drops from an ink jet nozzle as a plurality of marks on a relatively moving recording surface in which successively generated drops are each given successively less deflection and the nozzle is positioned relative to recording surface so that all of the recorded drops in the succession impact the recording surface at substantially the same time.

It is further object of this invention to provide an ink jet recording method which obviates the necessity of apparatus adjustment or change in electrial charging sequences upon changing the direction of motion of the ink jet head with respect to the recording surface.

The foregoing objects are attained in accordance with the invention by charging the recording drops issuing serially from an ink jet nozzle with successively smaller charges and directing the charged drops through an electrostatic force field toward a continuously relatively moving recording member. The charged drops are deflected perpendicularly to the motion of the member according to their charge in a reverse raster, and the nozzle is oriented relative to the member to vary the drop flight paths so that drops in the series impact the record member substantially simultaneously. Simultaneous impact obviates the necessity for head or signal adjustment, thus simplifying structure and controls. The invention is also readily adaptable to a plurality of nozzles such as a row inclined with respect to the direction of relative motion between nozzles and recording member.

The foregoing and other objects, features and advantages of the invention will be apparent from the following more particular description of preferred embodiments of the invention, as illustrated in the accompanying drawings.

DESCRIPTION OF THE PREFERRED EMBODIMENT

Figure 1A:
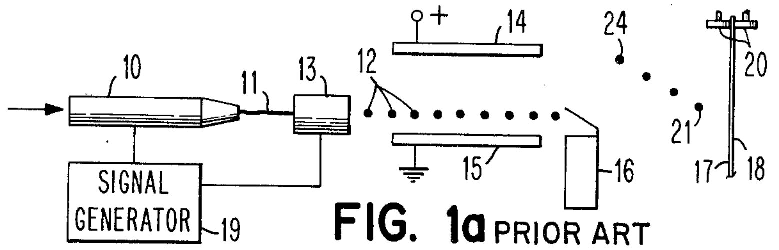
FIG. 1a PRIOR ART
FIGS. 1*a* and 1*b* are diagrams of a prior art ink jet recording apparatus illustrating the known technique of controlling drop placement with forward rastering.

In FIG. 1*a*, there is schematically illustrated a conventional ink jet recorder having a nozzle 10 from which issues an ink stream 11 that breaks into drops 12 within a charging ring 13. Ink is supplied under pressure to nozzle 10 and is perturbated by means not shown so as to break up into drops within the charging ring. The charging ring is connected to a signal generator 19 which induces selected charge levels in the drops. Drops 12 pass between a pair of electrostatically charged deflection electrodes 14, 15 which are effective to deflect upwardly above a gutter 16 any drops carrying an indeed charge thereon. Uncharged drops are intercepted by the gutter for disposal or reuse. The deflected drops continue on toward the surface 17 of a record member 18 where the drops form marks at the impact sites on the surface.

With the conventional recording method, a line segment is recorded on the surface 17 of the record member by deflecting selected ones of the drops 12 to different levels so that a plurality of drops form a vertical succession of marks. Each drop in a recording series is given a larger induced charge at charging ring 13 so that the last drop to form the recorded line segment receives the greatest charge. The drops for recording a line segment are shown in flight just before impact with the recording member. It will be noted that there is a considerable amount of time that will elapse between the impact times of the first drop 21 and last drop 24 of the four drop series at the surface of the record member.

Figure 1B:
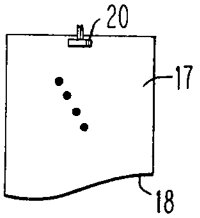
FIG. 1b PRIOR ART

Usually, recording occurs during relative movement between the printhead and recording member, indicated schematically by rolls 20. The effect of the delay in impact between neighboring drops is illustrated in FIG. 1*b*, a view of drop marks on recording surface 17 as seen from nozzle 10, in which the line segment slopes backward from the direction of motion of the recording member. As each of the selected drops is deflected from the path of the preceding drop, it encounters increased areodynamic drag which increases the original drop-to-drop spacing existing at the time of drop formation. The result of the slanted line segment in FIG. 1*b* can be corrected by tilting deflection electrodes 14 and 15 to compensate for the successive registration of droplets on the recording medium, which is moving relative to the printing means.

Figure 2A:
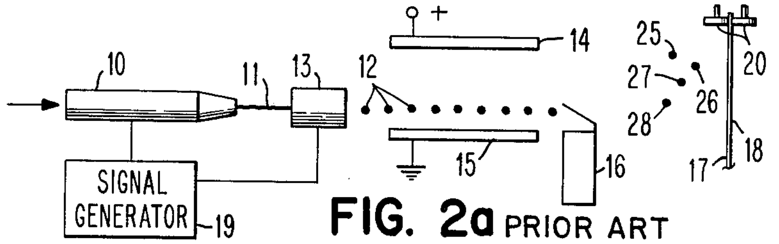
FIG. 2a PRIOR ART
FIGS. 2*a* and 2*b* are diagrams similar to FIGS. 1*a* and 1*b* illustrating the known technique of controlling drop placement with reverse rastering.
Figure 2B:
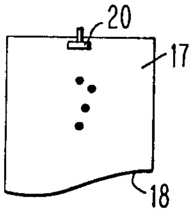
FIG. 2b PRIOR ART

Some compensation can be obtained by using reverse rastering of the drops instead of forward rastering as in FIG. 1*a*. The selected drops for the line segment are charged so that the first drop for the segment receives the greatest deflection and the succeeding drops used for recording each receive successively smaller charges and hence lesser deflections. The effect of this reverse rastering is illustrated in FIG. 2*a*. The uppermost drop 25 is the first one in the series of those used for marking and it reaches the recording surface at about the same time as the last drop 28 in the series because of areodynamic drag. However, second and third drops 26, 27 in the series precede the first and fourth drops. The effect of reverse rastering or recording and using sequentially generated drops for the recording series is shown in FIG. 2*b*. When a drop is deflected out of the wake of a preceding drop as in the case of the first drop in the series, the absence of turbulent air is markedly effective to slow the drop significantly. Therefore the effects of being first in the series and having the greatest deflection combine to slow the first drop. The succeeding marking drops have the benefit of turbulence created by the first drop or each other and are slowed less and in actually catch up or pass the first drop.

Figure 3A:
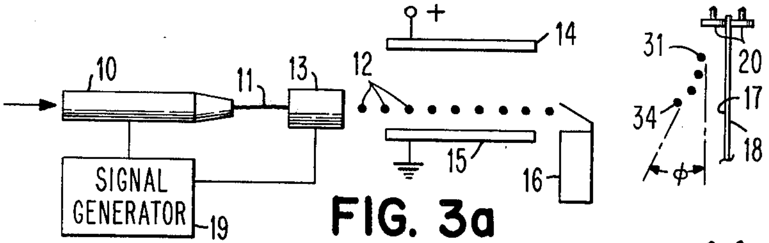
FIG. 3a PRIOR ART
FIGS. 3*a* and 3*b* are diagrams similar to FIGS. 2*a* and 2*b* illustrating the known technique of drop omission in a recording series while using reverse rastering.
Figure 3B:
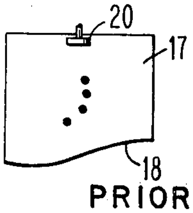
FIG. 3b PRIOR ART

Further improvement of the recorded line segment is possible by omission of selected drops in a series such as the second drop. The effect is shown in FIGS. 3*a* and 3*b*. In this case, the second in a series of five recording drops is directed to the gutter and the alignment of the line segment shows improvement as shown by drops 31-34. It will be noted that the drop series at or near the plane of impact now constitute a line in which the lower three marking drops are behind the first drop and lie along a line displaced by an angle $\phi$ from the vertical.

Figure 4A:
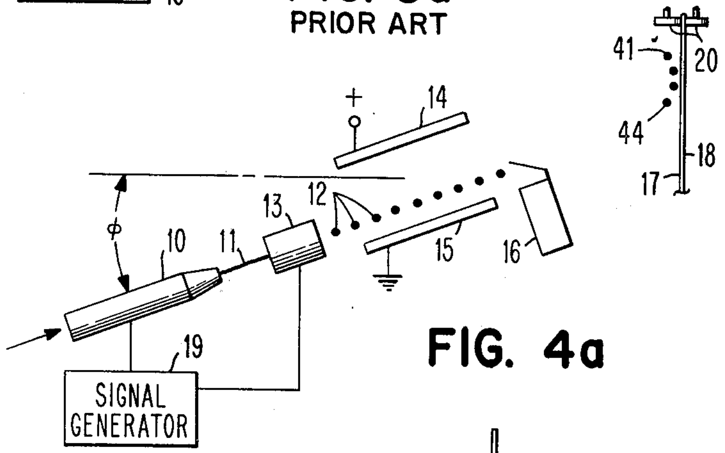
FIGS. 4*a* and 4*b* are diagrams of ink jet recording apparatus constructed and operated in accordance with the principles of the invention.
Figure 4B:
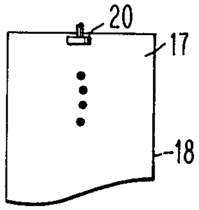

Further improvement in the alignment of the recorded line segment is possible in accordance with the invention by changing the orientation of the nozzle, charge ring, deflection plates, and gutter to that shown in FIG. 4*a*. In this figure, the assembly of printhead elements is rotated about the position of the first marking drop 41 at the plane of impact by an amount approximating the angle $\phi$ shown in FIG. 3*a*. Again, reverse restering is used for the drops and the second drop in a series is omitted. The effect of the new position in FIG. 4*a*, is to proportionately shorten the respective flight paths of the lower three depths 41-44 with respect to the first drop in the marking series. This results in almost simultaneous impact of the marking drops on the recording surface and appears as in FIG. 4*b*. Any remaining misalignment of the drops forming on line segment is negligible in a practical application.

In the foregoing description, the word "drop" may refer to a single drop or two or more merged drops. In addition, one or more drops that occur between two drops intended for use may be present in each series.

The positioning of the assembly of printhead elements is not restricted to relocation in an arc about the uppermost drop of the segment but may be judiciously located to obtain impact of the plurality of drops as nearly simultaneously as possible. It will be evident that simultaneous impact of the drops forming the line segment eliminates the need to correct for the relative motion between the printing means and recording medium while each series or drops is being recorded. Also, changing the direction of compensation is not required.

Figure 5A:
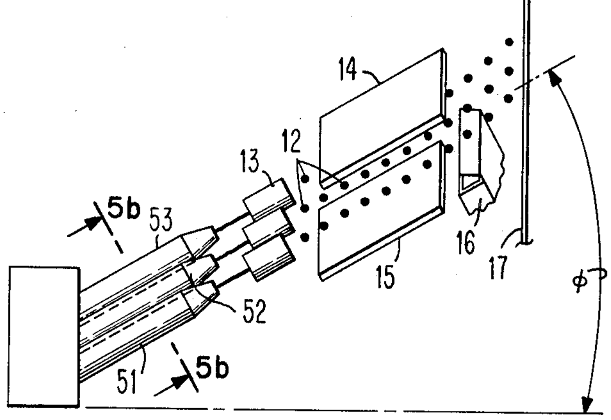
FIGS. 5*a* and 5*b* are elevation and sectional views of a multi-nozzle ink jet recording apparatus incorporating the invention of FIGS. 4*a* and 4*b*.
Figure 5B:
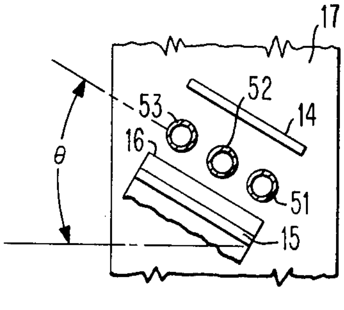

The invention lends itself to either single or multiple nozzle arrangements. For example, in FIGS. 5*a* and 5*b* a plurality of nozzles 51-53 are arranged in a row which is inclined with respect to the recording surface 17 by an angle $\theta$. The drops from each nozzle are deflected to multiple levels along lines 54 that are approximately normal to the angle of inclination. The nozzles are also tilted along an angle $\phi$ with respect to the angle $\theta$ to achieve substantially simultaneous impact of the drops that fall on the normal to the angle of inclination. Thus, there is no need to incorporate within the angle $\phi$ correction electrodes or movable electrodes for drop placement to compensate for relative velocity between nozzles and recording member.

While the invention has been particularly shown and described with reference to preferred embodiments therof, it will be understood by those skilled in the art that the foregoing and other changes in form and details may be made therein without departing from the spirit and scope of the invention.

What is claimed is:

1. In the method of operating a printer by issuing from a nozzle toward a relatively moving recording medium a stream of drops of marking liquid, and deflecting the drops in a plurality, each along a different path to the surface of said medium to impact said surface to form a row of marks thereon, the improvement comprising applying to the first drop in said plurality the greatest deflection and to each succeeding drop in said plurality a decreasing amount of deflection, and relatively positioning said nozzle with respect to said surface such that the drops in said plurality impact said surface substantially simultaneously.

2. In a printer having a nozzle from which a stream of drops of marking fluid issue toward a relatively moving recording surface, means for charging a selected plurality of said drops, each to different predetermined levels, deflecting means for directing said drops along individual paths according to the respective charge levels thereof to impact said surface in a row, the improvement of charging the drops in said plurality at successively decreasing levels and relatively positioning said nozzle with respect to said surface such that the drops in said plurality impact said surface substantially simultaneously.

3. A method of recording with a liquid marking nozzle on a relatively moving recording member comprising:

directing a stream of successive drops of marking liquid toward said recording member;

selecting from said stream a certain plurality of said drops for impact on said member;

deflecting each of said selected drops along a different trajectory toward said member with the first drop of said plurality having the greatest deflection and following drops having successively less deflection;

orienting said nozzle with respect to the impact point of said first drop in said plurality so as to proportionately shorten the flight paths of the other drops in accordance with their position in said plurality so that said drops impact said member substantially simultaneously and intercepting all non-selected ones of said drops.

4. The method as described in claim 3 further including the step of combining pairs of successive drops for each drop in said plurality.

5. The method as described in claim 3 wherein said printer has a plurality of nozzles issuing said drop pluralities with individual charging means, said nozzles being aligned in a row inclined with respect to the path of motion of said surface, and said nozzle plurality being tilted from an axis perpendicular to said surface an amount such that the drops in each nozzle plurality impact said surface substantially simultaneously.

* * * * *